United States Patent
Sieben

[11] 3,903,731
[45] Sept. 9, 1975

[54] APPARATUS FOR DETERMINING PHYSICAL PROPERTIES

[75] Inventor: Anthony Sieben, Saskatoon, Canada

[73] Assignee: Canadian Patents and Development Limited, Ottawa, Canada

[22] Filed: Feb. 27, 1974

[21] Appl. No.: 446,129

[52] U.S. Cl. .................... 73/54; 73/32 A; 73/67.2
[51] Int. Cl.$^2$ ................................. G01N 11/00
[58] Field of Search ............ 73/54, 67.2, 67.1, 67, 73/32 A

[56] References Cited
UNITED STATES PATENTS

| | | | |
|---|---|---|---|
| 3,138,955 | 6/1964 | Uttley | 73/32 A X |
| 3,177,705 | 4/1965 | Banks | 73/54 |
| 3,385,104 | 5/1968 | Banks | 73/67.2 |
| 3,449,940 | 6/1969 | Banks | 73/54 X |
| 3,504,526 | 4/1970 | Banks | 73/67 X |
| 3,583,209 | 6/1971 | Banks | 73/32 A |

Primary Examiner—Richard C. Queisser
Assistant Examiner—Joseph W. Roskos
Attorney, Agent, or Firm—Ronald G. Bitner

[57] ABSTRACT

An apparatus for determining the value or change in physical properties of a fluid, particularly viscosity, comprising a conduit that is vibrated longitudinally and wherein the relative movement of fluid in the conduit provides a measure of the physical property. According to the invention the conduit is in the form of an endless loop so that the fluid oscillations are confined to the loop, thereby providing an apparatus that is insensitive to conditions in the interconnecting conduits which conduct the fluid to the conduit loop for analysis. In the preferred embodiment, the loop comprises two independent loop sections, one section is vibrated while the vibrations are detected in the other. Two fluids can be compared by coupling two similar units that have common vibrating and detecting means.

9 Claims, 10 Drawing Figures

APPARATUS FOR DETERMINING PHYSICAL PROPERTIES

BACKGROUND OF THE INVENTION

This invention relates to an apparatus for determining the value or change in physical properties of fluids, and more particularly for determining viscosity.

Many methods for determining the viscosity of fluids have been devised in the past, including some which incorporate a vibrating conduit. One previous proposal described in U.S. Pat. No. 3,177,705 provides a tubular member for the fluid to be measured, vibrating the tubular member and measuring the amplitude of vibration of the member which provides a measure of viscosity. However, in that device the inlet and outlet conduits that connect with the vibrating tubular member are operationally an integral and inseparable part of the device which affects the measurements. For viscosity measurement it is essential that the fluid oscillates relative to the tubular member so that in the aforesaid device it is necessary that the connecting conduits have open ends or that the fluid be adjacent to a compressible fluid. Moreover, in the aforesaid device any change of condition in the connecting conduits will affect the measurement.

It has been found that limitations of previous devices can be overcome by providing that the tubular member in which the fluid oscillates is in the form of an endless loop. By providing an endless loop, the fluid oscillations are confined to the loop itself making the apparatus independent of the conditions in the interconnecting inlet and outlet conduits external to the loop.

SUMMARY OF THE INVENTION

An object of the present invention is to provide an apparatus for determining the value or change in physical properties of flowing or static fluids.

Another object is to provide an apparatus capable of providing continuous measurement.

Another object is to provide flow-through or on-line measurement.

Another object is to provide a constant volume for measurement.

Another object is to provide a physical property determining apparatus of high sensitivity.

Another object is to provide an apparatus for determining properties which is insensitive to the conditions external to the measuring element.

Another object is to provide an apparatus that is particularly suited for determining the viscosity of small volumes.

Another object is to provide an apparatus for comparing the physical properties of two fluids simultaneously.

The present invention provides an apparatus for determining physical properties comprising a conduit defining an endless loop, the conduit having flexible segments and means for supporting the conduit for longitudinal movement of at least one portion thereof, vibration means for longitudinally vibrating one portion of the conduit, vibration detecting means for detecting the vibration in said one or other portion of the conduit, and inlet means and outlet means communicating with the conduit.

Preferably the conduit loop comprises two independent sections with the vibrating means associated with one section and the detecting means associated with the other. Preferably also the inlet and outlet are connected to the mid-point of the two sections.

DESCRIPTION OF THE PREFERRED EMBODIMENTS

Figure 1:
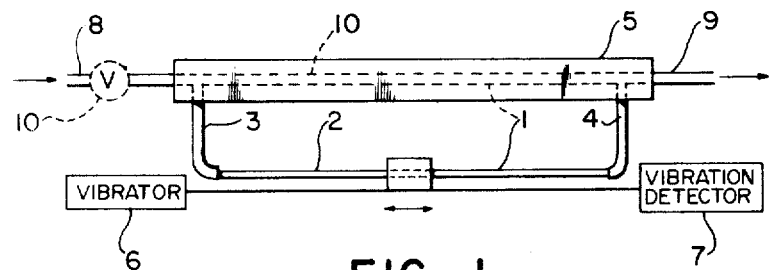
FIG. 1 illustrates an elementary embodiment of an apparatus for determining physical properties of a fluid in accordance with the invention.

Referring to FIG. 1, which illustrates one elementary embodiment of the invention, the apparatus comprises a conduit 1 which defines an endless loop. The conduit 1 includes flexible segments 3 and 4 and is supported by member 5 in a manner to allow longitudinal movement of portion 2 of the conduit 1. Vibration drive means 6 is adapted to vibrate the conduit portion 2 longitudinally while vibration detecting means 7 detects the longitudinal vibration of conduit portion 2. Communicating with the conduit are inlet means 8 and outlet means 9.

Since the conduit 1 is in the form of an endless loop, the fluid is free to oscillate within the loop. Furthermore, the endless conduit loop ensures that the sample volume is maintained constant even though fluid flows through it.

Referring to FIG. 1, and considering viscosity as the physical property to be measured, vibration drive means 6 is supplied with constant power so that the amplitude of oscillation varies with the load. In operation, when conduit portion 2 is vibrated, the fluid within the conduit will add load to drive means 6 proportional to the viscosity of the fluid. With constant power supplied to drive means 6, the amplitude of oscillation, as detected by vibration detecting means 7, will vary inversely with the viscosity of the fluid.

Figure 2:
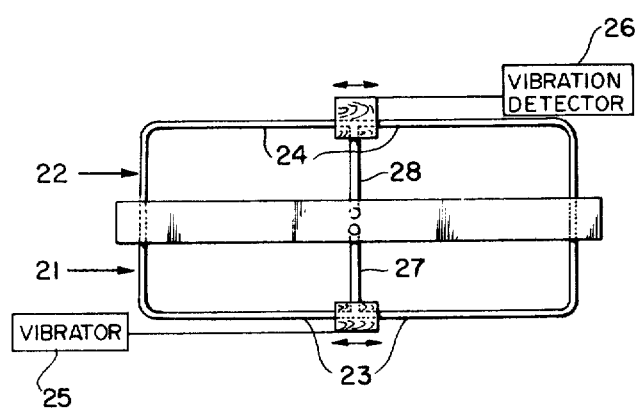
FIGS. 2 and 3 illustrate further embodiments of the present invention.

In the embodiment of FIG. 2 the conduit comprises two loop sections 21 and 22. Each section 21 and 22 has a portion 23 and 24, respectively, adapted for longitudinal movement, independent of the other. Vibration drive means 25 vibrates portion 23 of loop section 21 which causes fluid in the conduit to oscillate in conduit loop sections 23 and 24. Vibration detecting means 26 detects the vibrations produced in portion 24 of loop section 22. Vibration drive means 25 may be selected to provide constant amplitude or constant power (variable amplitude).

If drive means 25 provides constant amplitude of oscillation of conduit portion 23, the amplitude of oscillation of the fluid in the conduit is inversely proportional to the viscosity. The amplitude of oscillation of conduit portion 24 varies with the amplitude of oscillation of the fluid. Therefore, the amplitude of oscillation of conduit portion 24, as detected by detecting means 26, varies inversely with the viscosity of the fluid.

If the power to vibration means 25 is constant so that the amplitude of oscillation of loop section 23 varies with load, then the amplitude of oscillation of loop section 23 varies inversely with viscosity. The amplitude of oscillation of loop section 24, as detected by detector 26, varies inversely with viscosity and also with the amplitude of oscillation of the fluid in loop section 23. Since the amplitude of oscillation of the fluid of loop section 23 also varies inversely with viscosity, the effect is increased. Hence, with varying amplitude drive means greater sensitivity to viscosity and at the same time reduced sensitivity to density can be obtained relative to constant amplitude drive means.

With the inlet 8 and outlet 9 located as in FIG. 1, conduit portion 2 will be affected by fluid flowing through it. Moreover, any variation in flow rate will result in corresponding oscillations of the conduit portion 2 which will be detected by detecting means 7. One possible solution to this problem is to provide a valve 10 at the inlet that prevents flow through the conduit while a measurement is taken. However the problem can be eliminated by changing the inlet and outlet as illustrated in FIG. 2, so that continuous flow through can be provided without hindering operation.

Referring now to FIG. 2, the inlet 27 and outlet 28 are interconnected at the mid point of loop sections 21 and 22 defining two identical but opposing passageways for fluid supplied to the inlet 28. It can be seen that longitudinal forces produced by flow through the loop sections will cancel, and will not affect vibration detecting means 25. Moreover oscillation of the fluid in the loop does not affect the fluid in the conduits that interconnect with the loop. This feature is incorporated in all the following embodiments.

The conduit may consist entirely of flexible tubing or may include rigid portions connected with flexible portions to allow the required oscillation.

Figure 3:
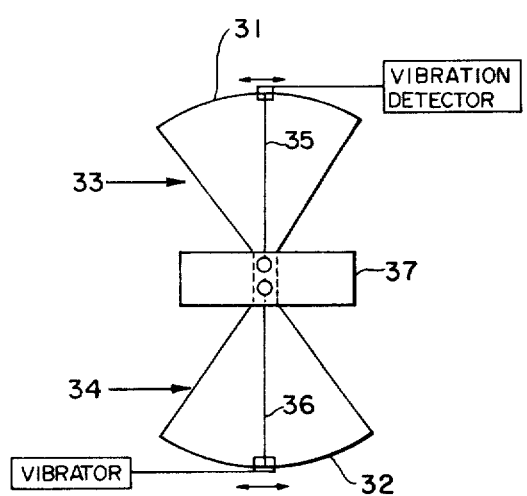

In FIG. 3 each of the conduit portions 31 and 32 are in the form of an arc and the conduit loop sections 33 and 34 and interconnecting inlet and outlet segments 35 and 36 are attached to supporting member 37 at approximately the centre of curvature of the arc portions 31 and 32. This arrangement provides an advantage over that of FIG. 2, for example, in avoiding lateral displacement of the conduit portions 31 and 32 as they oscillate. In other respects this embodiment operates indentically to that of FIG. 2.

Figure 4:
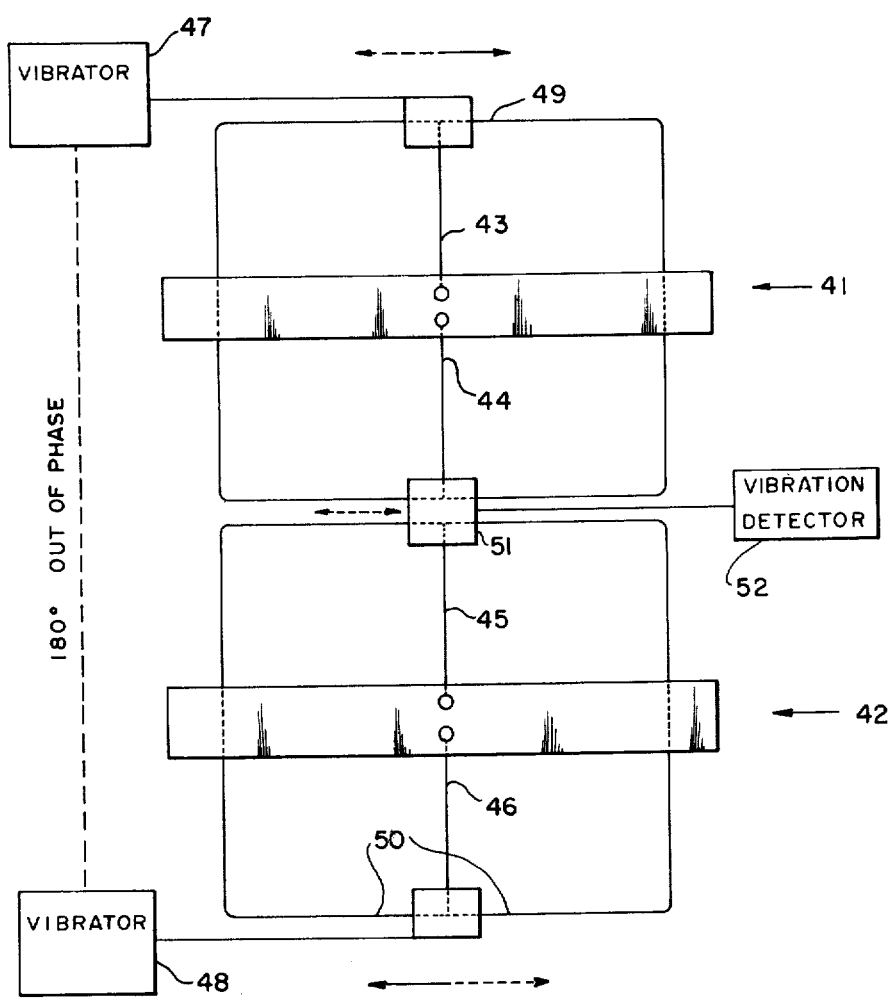
FIG. 4 illustrates schematically an apparatus for comparing two fluids.

FIG. 4 shows schematically how an apparatus 41 of the general type shown in FIG. 2 may be coupled with another similar unit 42 for comparing two fluids supplied through inlets 43 and 45 and outlets 44 and 46, respectively. Shown are vibrating drive means 47 and 48 which vibrate loop portions 49 and 50 180° out of phase relative to one another at equal amplitude. Preferably the drive means 47 and 48 will be a single unit arranged to provide the required 180° phase difference. It can be seen that the effects of fluid oscillation in conduit portions 49 and 50 will oppose one another at the interconnecting point 51, and if the physical properties of the fluids in each unit 41 and 42 are the same, the net output will be zero. If the viscosity, for example, differs, the output as detected by detecting means 52, will be in phase with the unit that contains the fluid of lower viscosity.

Figure 5:
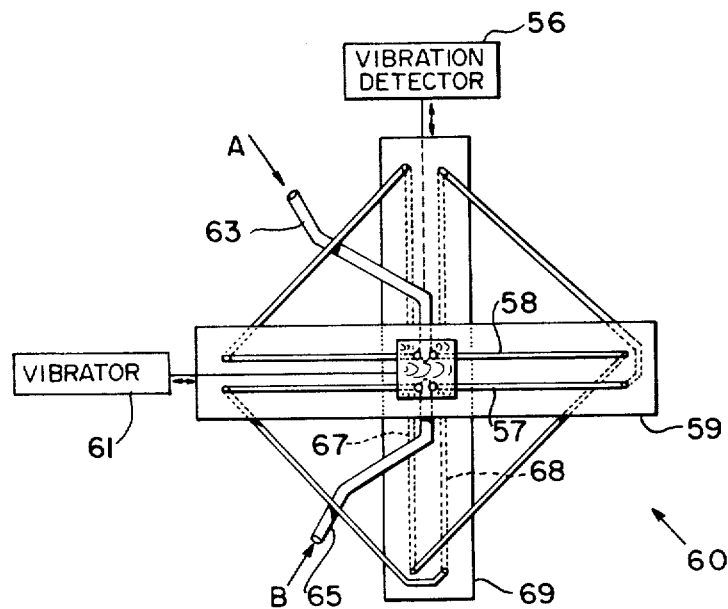
FIG. 5 is a plan view of an apparatus for comparing two fluids.
Figure 6:
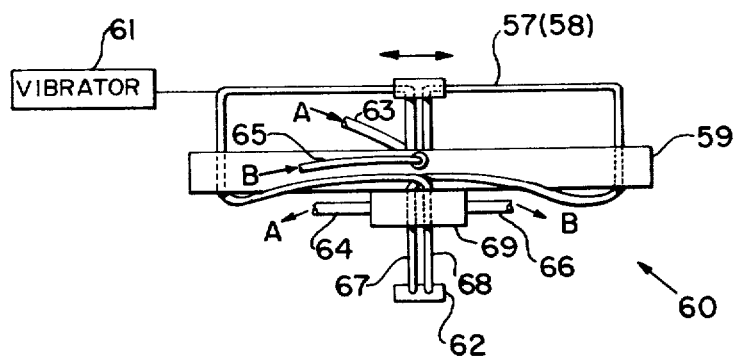
FIG. 6 is an elevation of the apparatus of FIG. 5.

FIGS. 5 and 6 show one embodiment of an apparatus 60 for comparing two fluids using the principle described with reference to FIG. 4. The configuration shown allows single vibrating means 61 to provide the required 180° phase relationship so that the output at 62 as measured by detector 56, provides an indication of the difference in physical properties of two fluids. The inlet and outlet for one fluid are 63 and 64, respectively, and for the other fluid are 65 and 66, respectively. Conduit loop sections 67 and 68 and supporting member 69 are substantially identical to conduit loop sections 57 and 58 and supporting member 59, and are disposed perpendicular to one another.

Figure 7:
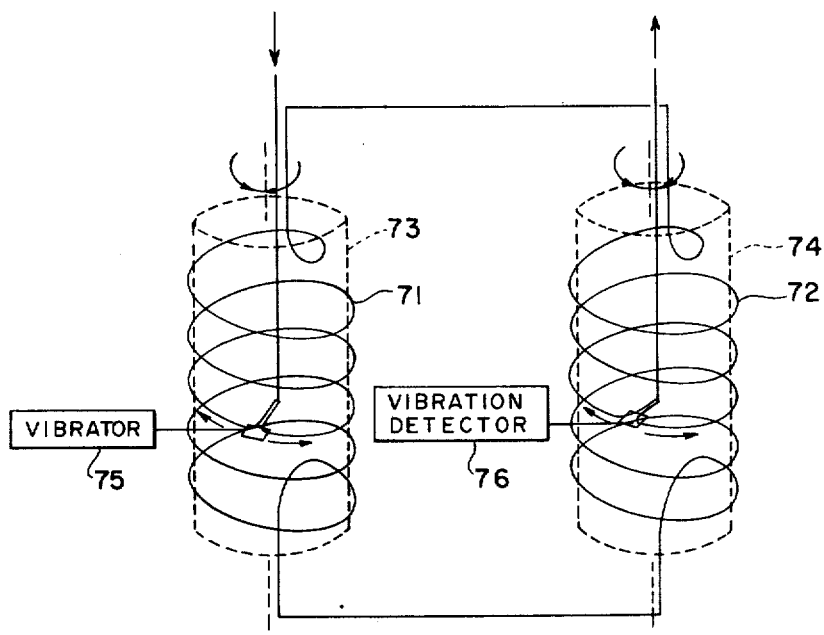
FIG. 7 is a schematic illustration of another embodiment for determining viscosity.

In FIG. 7 the vibrating portions of the conduit are in the form of coils 71 and 72, preferably wound around suitable cylinders 73 and 74, respectively. Vibrating means 75 applies torsional vibration to the coil 71 while detecting means 76 measures the torsional vibration of coil 72. In other respects the apparatus functions similar to the apparatus of FIG. 2.

Figure 8:
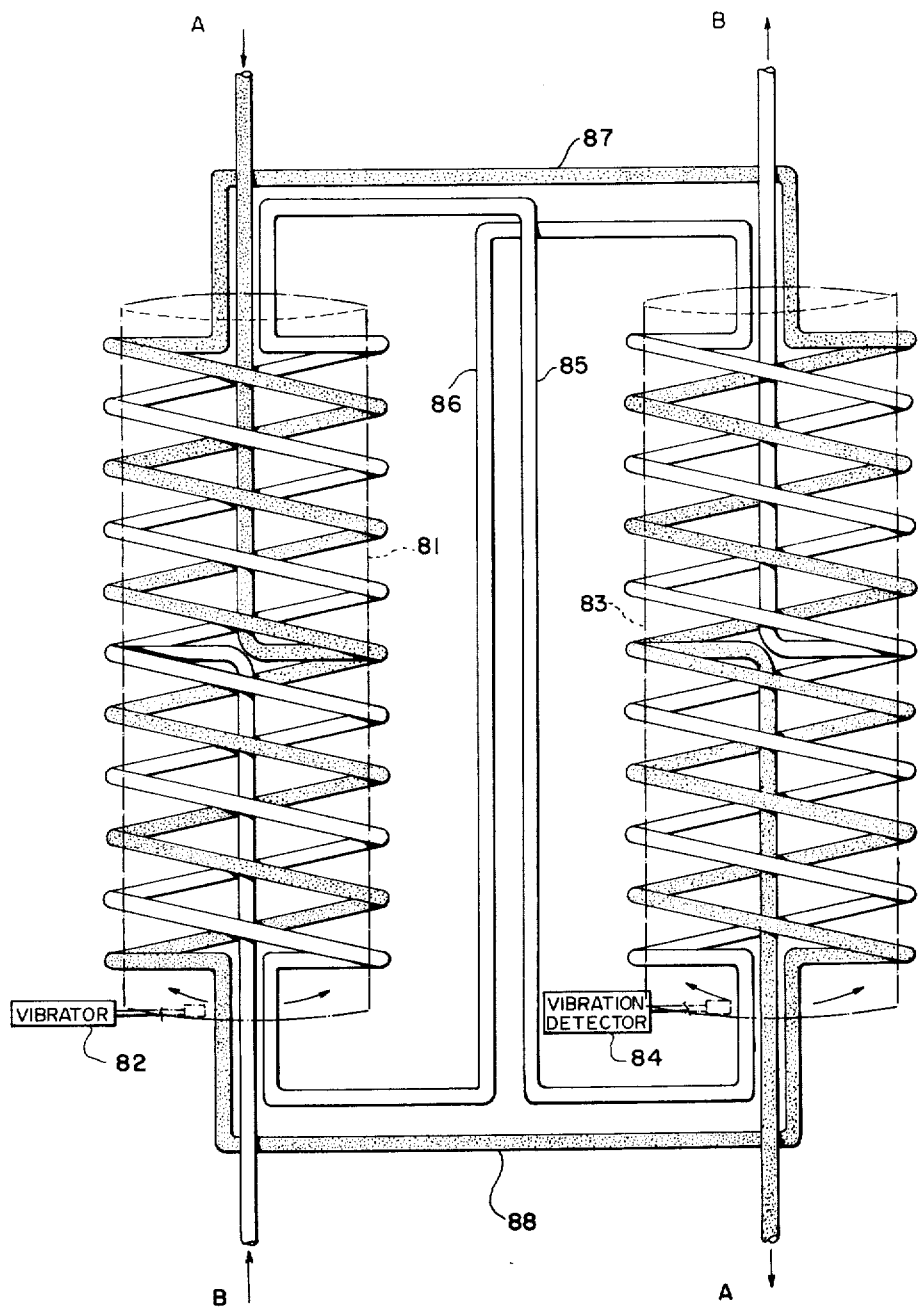
FIG. 8 is a schematic illustration of an embodiment incorporating features of FIG. 7 adapted for comparing two fluids.

FIG. 8 shows schematically how the configuration of FIG. 7 can be modified for comparing two fluids. By forming two conduit coils on cylinder 81 the amplitude of oscillation provided by vibration means 82 will be identical. The net oscillation of cylinder 83 as detected by detecting means 84 varies with the difference of viscosity of fluid A and B. For proper operation the conduit portions 85, 86, 87 and 88, which interconnect the coils, are of equal length.

Figure 9:
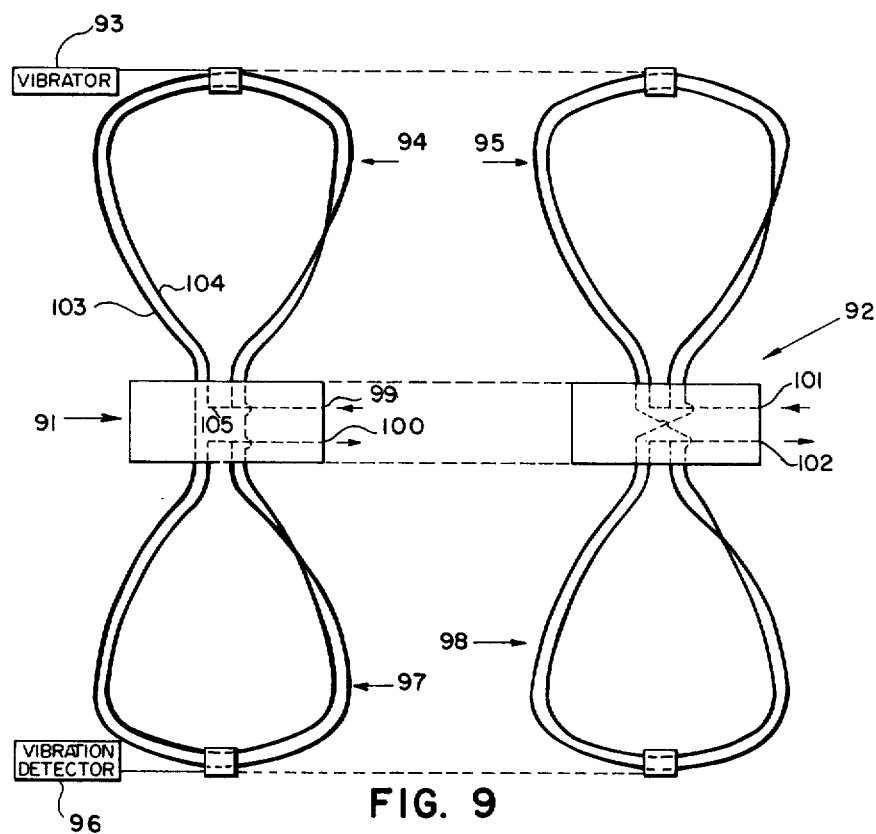
FIG. 9 illustrates a further embodiment for comparing two fluids.

FIG. 9 illustrates schematically another embodiment for comparing two fluids. This embodiment incorporates a number of features of the previous embodiments, notably having the vibrating portions in the form of arcs and with the loop sections connected substantially at the center of curvature of the arc, as in FIG. 3. The apparatus comprises two units 91 and 92. The units are adapted to be superimposed on to one another so that vibration drive means 93 oscillates loop sections 94 and 95 simultaneously, and vibration detecting means 96 detects the combined oscillation of loop sections 97 and 98.

One fluid is supplied to the conduit of unit 91 by means of inlet 99 and outlet 100, and the other fluid with which the first fluid is to be compared is supplied to the conduit of unit 92 by means of inlet 101 and outlet 102.

It will be noted again that the inlets and outlets communicate with the mid point of the respective loop with one half of each loop section superimposed on the other half. For example, the conduit loop section 94 comprises two superimposed half sections 103 and 104, that are interconnected at 105, and at this point also communicate with inlet 99. As stated previously with reference to FIG. 2, the central location of the inlets and outlets in each loop section provides that the apparatus is insensitive to external influences. It will be noted that in this embodiment the mid point of each loop section is fixed.

It can be seen that loop section 98 is in effect twisted 180° relative to section 97 in order that the difference in properties is measured by detecting means 96.

Preferably each of the conduit loop sections are formed integrally of flexible tubing for simplicity of construction. The embodiment of FIG. 9 is particularly suited for determining the physical properties of small sample volumes.

Figure 10:
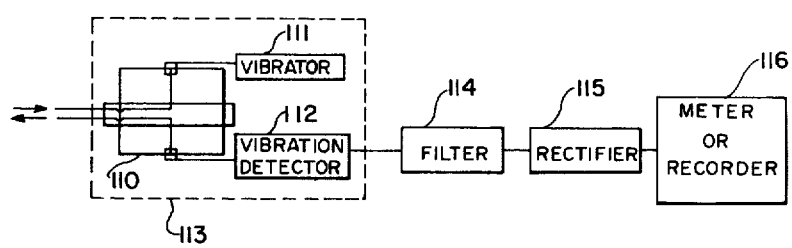
FIG. 10 is a schematic illustration of a complete apparatus for continuously determining physical properties.

FIG. 10 illustrates schematically a complete apparatus for providing a continuous determination of physical properties. The conduit with supporting structure 110, vibrating drive means 111, and vibration detecting means 112 are enclosed in a suitable structure 113 to provide constant temperature, to exclude sound waves and isolate from vibrations. The output of the detector is amplified, filtered at 114 and rectified at 115. The output may be further filtered and amplified and is read by a voltmeter on recorder 116.

In apparatus constructed, vibration drive means found to be suitable were a loudspeaker voice coil. Suitable detecting means were a phonographic cartridge or microphone transducer.

The signal to noise ratio and the sensitivity of the apparatus are improved with increased rate of shear or amplitude of oscillation but this causes an increase in frictional heating. For this reason the lowest amplitude of oscillation which gives an output signal of sufficient magnitude is chosen. The amplitude used for most viscosity measurements was 10 $\mu$ m.

Conduits were constructed from 20 $\mu$ 1 capillary tubes, 60 mm long. Some embodiments comprised both glass and polyethylene tubing. The apparatus has a wide dynamic range. Rates of change of viscosity of 0.0003 to 3.0 centistokes per minute were observed.

In the present invention the vibration means need not operate at the resonant frequency, however the most useful frequency is that which gives maximum response. The invention can be adapted for fluids of all types, including gases.

Although the present invention is particularly suitable for measuring viscosity, it may also be used for determining other physical properties such as density and specific gravity, for example.

The apparatus was found to be particularly useful for determining enzyme reaction rates on various polymeric substrates.

Since the invention can provide a continuous readout, it is useful where feedback control is desired. For example, it can be used for quality control, automatic sampling and monitoring, or as a temperature programmed viscometer.

What is claimed is:

1. An apparatus for determining physical properties of a fluid comprising:
   a. a conduit defining an endless loop for containing the fluid;
   b. said conduit having flexible segments and means for supporting the conduit for longitudinal movement of at least one portion thereof;
   c. constant power vibration means for longitudinally vibrating one said portion of the conduit;
   d. vibration detecting means for detecting the vibration in said one or other portion of the conduit; and
   e. inlet means and outlet means communicating with the conduit, said inlet and outlet means being disposed to divide the loop into two substantially equal loop portions.

2. The apparatus of claim 1 for measuring viscosity.

3. An apparatus for determining physical properties of a fluid comprising:
   a. a conduit defining an endless loop for containing the fluid;
   b. said conduit having two loop sections, each section having flexible segments and means supporting the conduit for longitudinal movement of a portion of each section;
   c. vibration means for longitudinally vibrating said portion of one loop section;
   d. vibration detecting means for detecting the vibration in said portion of the other section; and
   e. inlet means communicating substantially with the mid point of one loop section and outlet means communicating with the mid point of the other loop section.

4. The apparatus of claim 3 wherein the first and second loop sections have substantially equal lengths.

5. The apparatus of claim 3 coupled with another similar apparatus for comparing two fluids, the coupled apparatus having a single common vibration detecting means and single common vibration means adapted to vibrate a portion of the loop section of one apparatus 180° out of phase relative to that of the other such that the vibration detecting means provides an indication of the difference in the physical properties of the two fluids.

6. The apparatus of claim 5 wherein the vibrating portions of one apparatus are superimposed on the corresponding vibrating portions of the other apparatus.

7. The apparatus of claim 3 wherein each loop section is shaped to define two loops superimposed on one another and wherein the mid point of the loop section is fixed.

8. The apparatus of claim 3 wherein each portion adapted for longitudinal movement is in the form of an arc and wherein the loop section is fixed at substantially the center of curvature of the arc.

9. The apparatus of claim 3 wherein each loop section defines a coil, each coil being adapted for torsional vibration about the central axis thereof.

* * * * *